United States Patent
Daiki et al.

(10) Patent No.: US 10,919,767 B2
(45) Date of Patent: Feb. 16, 2021

(54) HEXAGONAL BORON NITRIDE POWDER AND PRODUCTION PROCESS THEREFOR

(71) Applicant: TOKUYAMA CORPORATION, Shunan (JP)

(72) Inventors: Shota Daiki, Shunan (JP); Ryuji Ishimoto, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 152 days.

(21) Appl. No.: 16/340,947

(22) PCT Filed: Nov. 28, 2017

(86) PCT No.: PCT/JP2017/042545
§ 371 (c)(1),
(2) Date: Apr. 10, 2019

(87) PCT Pub. No.: WO2018/101241
PCT Pub. Date: Jun. 7, 2018

(65) Prior Publication Data
US 2019/0225494 A1    Jul. 25, 2019

(30) Foreign Application Priority Data

Dec. 1, 2016   (JP) .............................. JP2016-234448

(51) Int. Cl.
*C01B 21/06* (2006.01)
*C01B 21/064* (2006.01)
(Continued)

(52) U.S. Cl.
CPC ........ *C01B 21/0645* (2013.01); *C01B 21/064* (2013.01); *C08K 3/22* (2013.01);
(Continued)

(58) Field of Classification Search
CPC ..... C01B 21/0645; C01B 21/064; C08K 3/22; C08K 3/38; C08K 3/28
See application file for complete search history.

(56) References Cited

FOREIGN PATENT DOCUMENTS

| JP | 2010-76956 A | 4/2010 |
| JP | 2015-137335 A | 7/2015 |

(Continued)

OTHER PUBLICATIONS

Extended European Search Report, dated Jun. 29, 2020, for corresponding European Application No. 17876135.9.

(Continued)

*Primary Examiner* — John E Uselding
(74) *Attorney, Agent, or Firm* — Birch, Stewart, Kolasch & Birch, LLP

(57) ABSTRACT

A hexagonal boron nitride powder whose maximum absorption peak within the range of 3,100 to 3,800 $cm^{-1}$ of the diffuse reflectance fourier transform infrared spectrum is existent at 3,530 to 3,590 $cm^{-1}$ and which is able to provide high heat conductivity, dielectric strength and copper foil peel strength to a resin composition obtained by filling the powder into a resin, and a process for producing the above boron nitride powder by mixing together an oxygen-containing boron compound, a carbon source having a sulfur concentration of 1,000 to 10,000 ppm and an oxygen-containing calcium compound in a specific ratio and reduction nitriding the mixture.

19 Claims, 5 Drawing Sheets

(51) Int. Cl.
    *C08K 3/22*     (2006.01)
    *C08K 3/28*     (2006.01)
    *C08K 3/38*     (2006.01)

(52) U.S. Cl.
    CPC ............... *C08K 3/28* (2013.01); *C08K 3/38* (2013.01); *C01P 2002/01* (2013.01); *C01P 2002/76* (2013.01); *C01P 2002/82* (2013.01); *C01P 2004/04* (2013.01); *C01P 2006/12* (2013.01); *C01P 2006/20* (2013.01); *C01P 2006/32* (2013.01); *C01P 2006/40* (2013.01); *C08K 2003/2227* (2013.01); *C08K 2003/282* (2013.01); *C08K 2003/385* (2013.01)

(56) References Cited

FOREIGN PATENT DOCUMENTS

| | | |
|---|---|---|
| JP | 2015-212217 A | 11/2015 |
| WO | WO 2016/092952 A1 | 6/2016 |

OTHER PUBLICATIONS

Baraton et al., "Surface Activity of a Boron Nitride Powder: A Vibrational Study", Langmuir, vol. 9, No. 6, Feb. 22, 1993, pp. 1486-1491.

Gao et al., "High-performance Hexagonal Boron Nitride/ Bismaleimide Composites with High Thermal Conductivity, Low Coefficient of Thermal Expansion, and Low Dielectric Loss", Polymers for Advanced Technologies, vol. 23, No. 5, 2012, pp. 919-928.

International Preliminary Report on Patentability and English translation of the Written Opinion of the International Searching Authority (Forms PCT/IB/373, and PCT/ISA/237) for International Application No. PCT/JP2017/042545, dated Jun. 4, 2019, with English translation.

International Search Report (Form PCT/ISA/210) for International Application No. PCT/JP2017/042545, dated Mar. 6, 2018, with English translation.

Singhal et al., "Fabrication of Al-Matrix Composites Reinforced with Amino Functionalized Boron Nitride Nanotubes", Journal of Nanoscience and Nanotechnology, vol. 11, No. 6, Jun. 2011, pp. 5179-5186.

[Fig. 1]
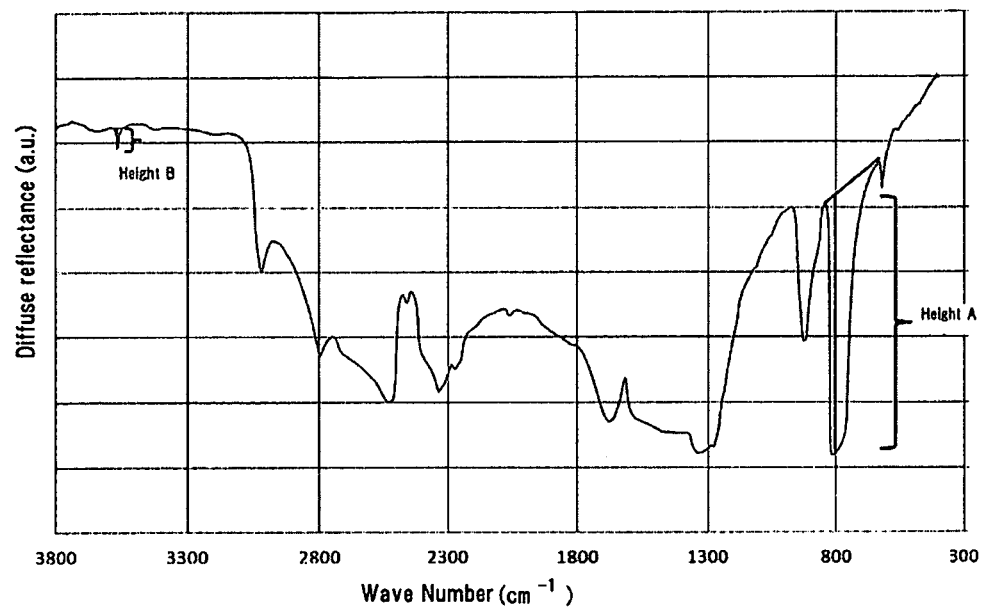
[Fig. 2]
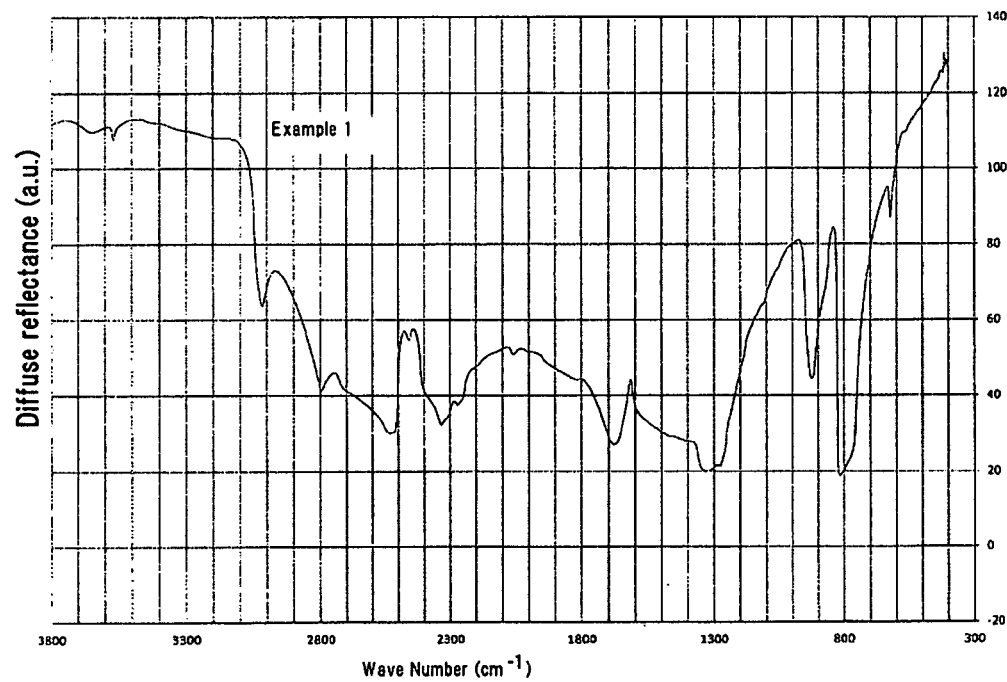

[Fig. 3]
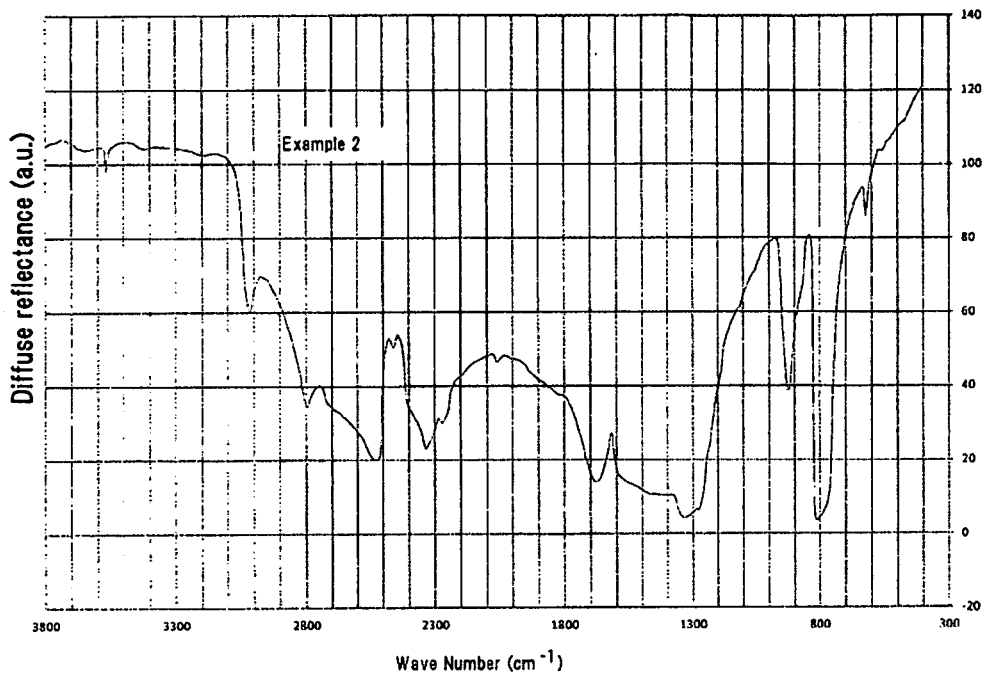
[Fig. 4]
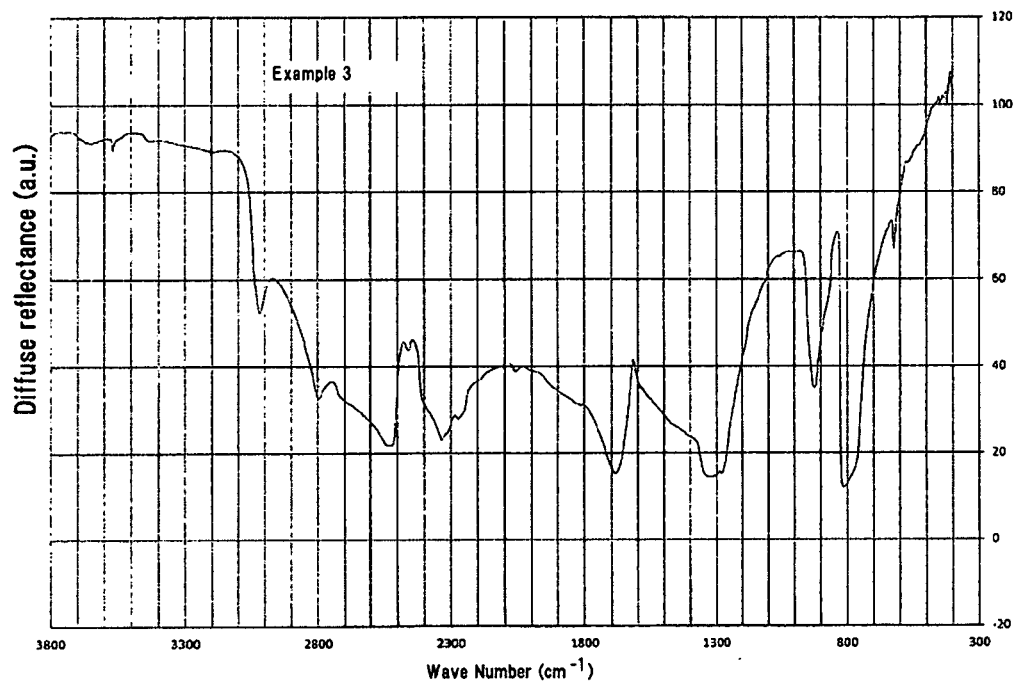

[Fig. 5]
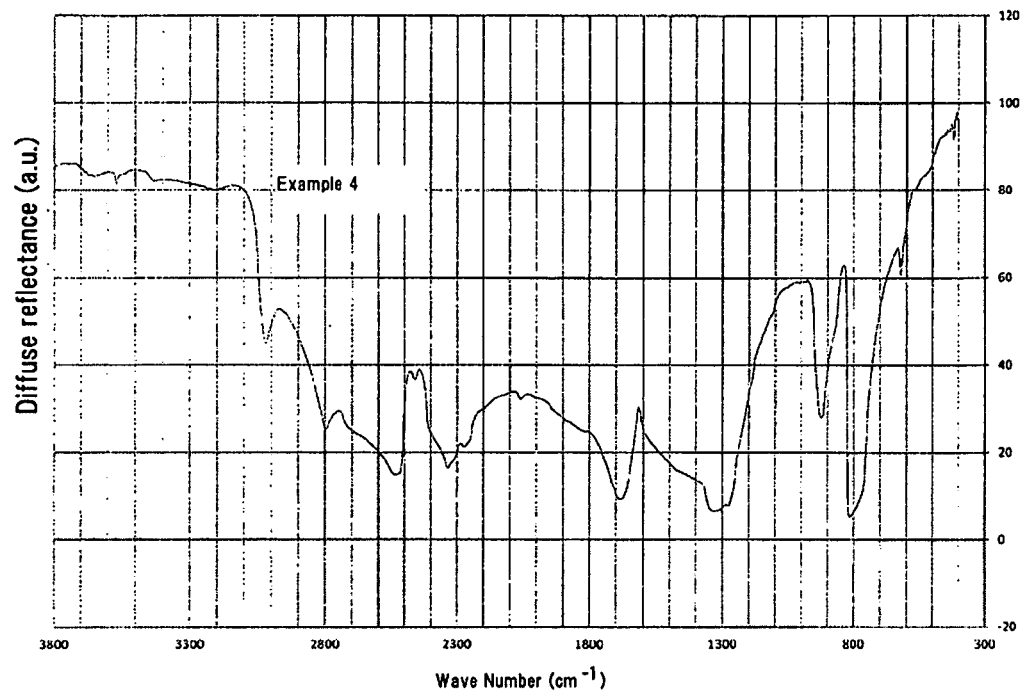
[Fig. 6]
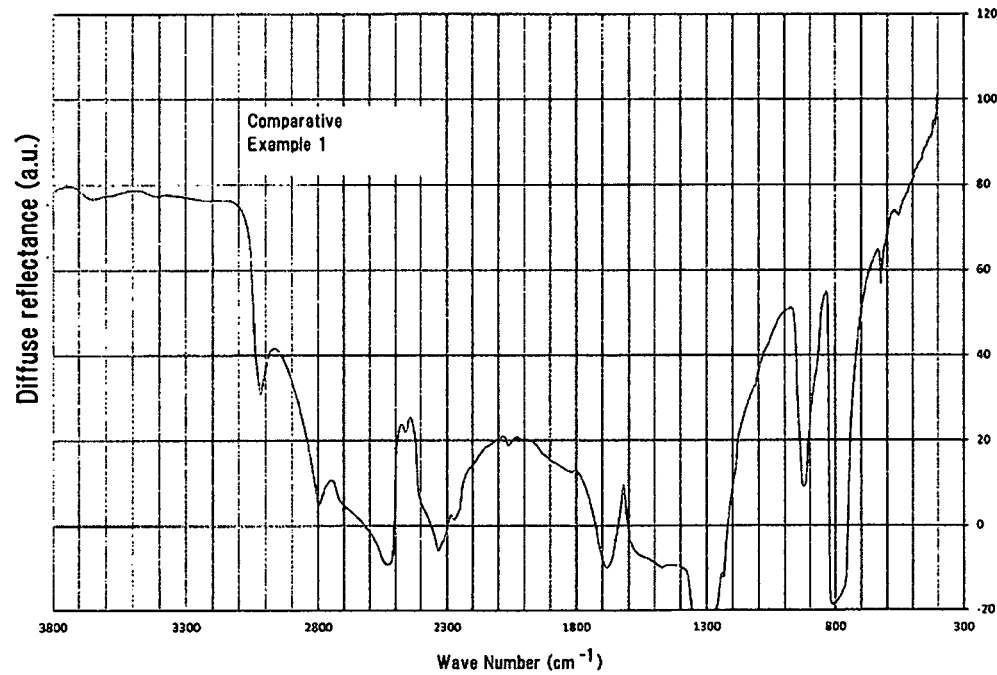

[Fig. 7]
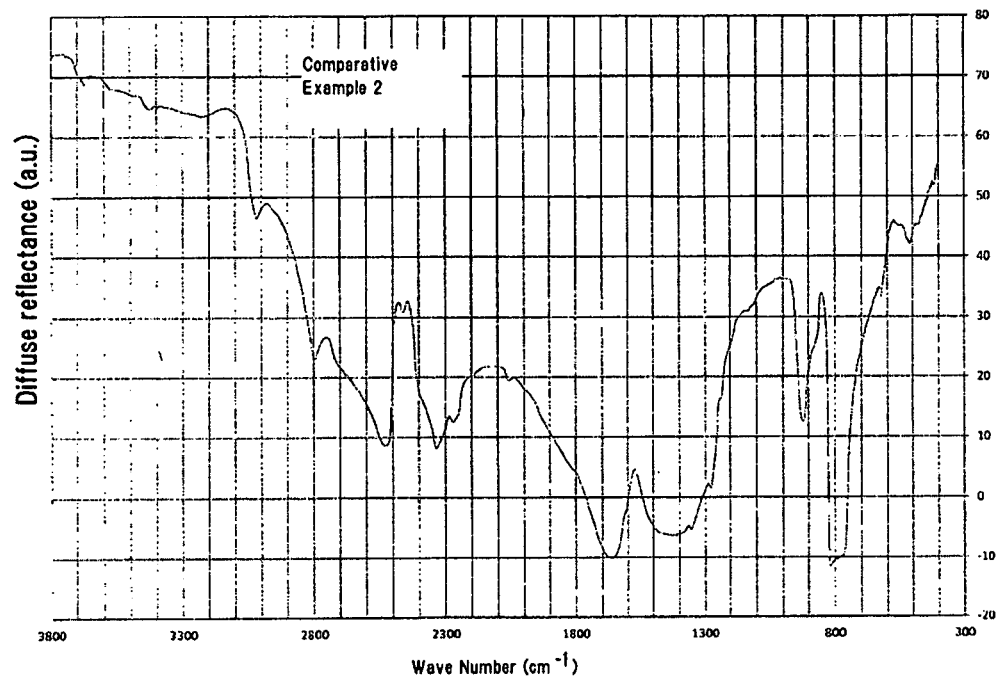
[Fig. 8]
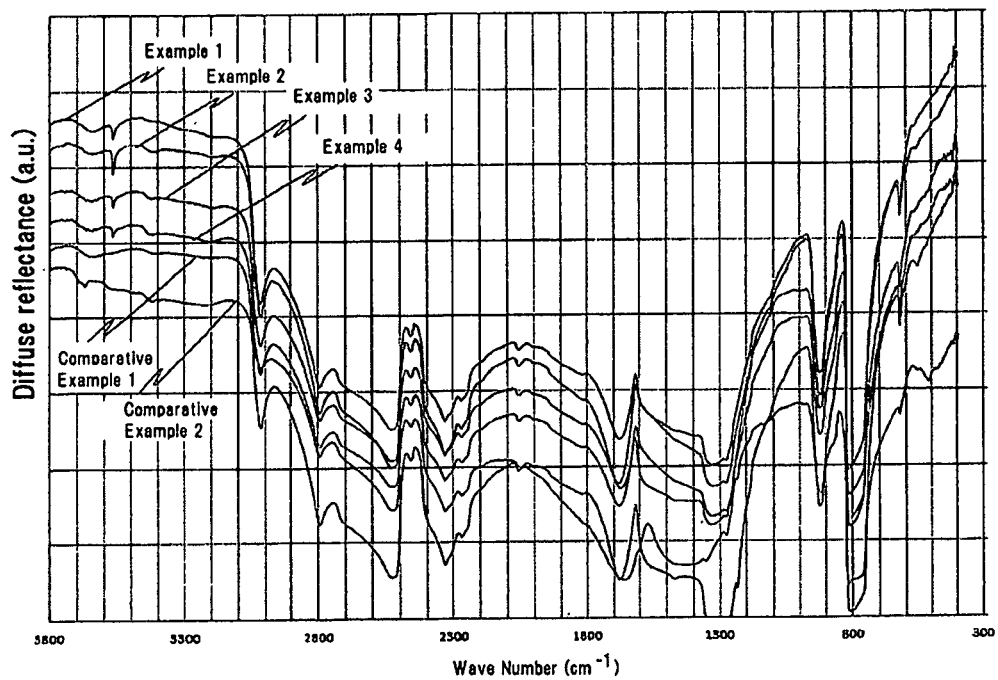

[Fig. 9]
[Fig. 10]
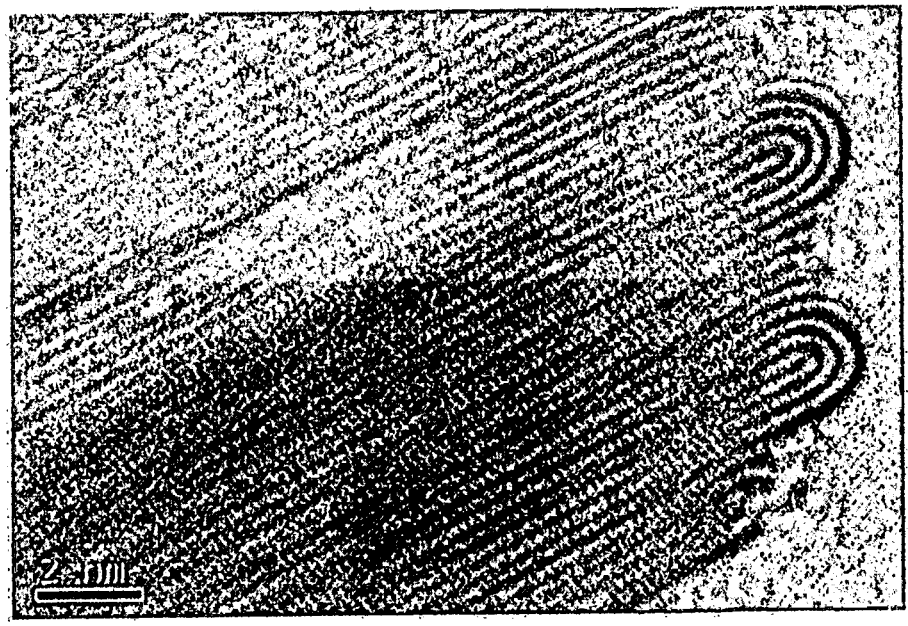

HEXAGONAL BORON NITRIDE POWDER AND PRODUCTION PROCESS THEREFOR

TECHNICAL FIELD

The present invention relates to a novel hexagonal boron nitride powder and a production process therefor. More specifically, it relates to a hexagonal boron nitride powder which has excellent affinity for a resin having high affinity for an $NH_2$ group and can provide the obtained resin composition with high heat conductivity, high dielectric strength and high adhesive strength to copper foil and to a production process therefor.

BACKGROUND ART

A hexagonal boron nitride powder is generally a white powder having the same hexagonal layer structure as graphite and has many characteristic properties such as high heat conductivity, high electric insulation, high lubricity, corrosion resistance, releasability, high-temperature stability, low dielectric constant and chemical stability. Therefore, a resin composition comprising this hexagonal boron nitride powder is advantageously used as a heat conductive insulating sheet by molding.

The hexagonal boron nitride powder contains primary particles composed of scaly particles derived from its crystal structure, and the scaly particles have thermal anisotropy. In general, in the case of a heat conductive insulating sheet comprising the above boron nitride powder containing scaly particles as a filler, as the scaly particles are oriented in the plane direction of the heat conductive insulating sheet. Therefore, heat is transmitted in the c-axis direction having low heat conductivity of each of the scaly particles with the result that the heat conductivity in the thickness direction of the heat conductive insulating sheet becomes low.

Further, the hexagonal boron nitride particle has layers of hexagonal plane faces on which a B atom and an N atom are bonded to each other, there is no functional group on the above plane faces, and an OH group and an $NH_2$ group are bonded to the B atom on the end faces orthogonal to the plane faces. The hexagonal boron nitride particle is generally scaly, the area of the end face is smaller than the above plane face, and therefore, the amount of the functional group is small.

The hexagonal boron nitride particle having a small amount of the functional group has low affinity for a resin due to the small amount of the functional group. When a resin composition comprising the particles is prepared, heat resistance is produced at the interface between the hexagonal boron nitride and the resin, thereby making it difficult to transmit heat. When the hexagonal boron nitride powder is used as a resin-filling inorganic filler, the above problem occurs due to the scaly form of the particle and an insufficient amount of the surface functional group.

Meanwhile, as a hexagonal boron nitride powder having a large amount of a functional group, there are provided a hexagonal boron nitride powder into which an $NH_2$ group has been directly introduced by carrying out an atmospheric plasma treatment in an inert atmosphere and a hexagonal boron nitride powder containing an OH group and an $NH_2$ group which is synthesized from boric acid, borax or melamine by a melamine method (Patent Documents 1 and 2).

Non-patent document 1 reports that, when $H_2$ is added at a rate of 20 mbar per hour to boron nitride produced from permanent gas flow $BCl_3$ and $NH_3$ through a chemical vapor reaction at room temperature, OH and $NH/NH_2$ band asymmetrical extensions are seen at 3,100 to 4,000 $cm^{-1}$. This boron nitride is characterized in that the maximum absorption peak within this range is existent at 3,100 to 3,500 $cm^{-1}$.

However, functional group introduction treatments by ultraviolet irradiation, ozone treatment or plasma treatment all of which are general surface modification treatments for boron nitride powders involve problems such as difficulty of industrial-scale mass-production and a rise in cost as well as the activation of the surface of boron nitride, thereby raising reactivity with moisture in the air with the result that the water resistance of the boron nitride powder and the dielectric strength of the obtained resin composition may be deteriorated. A water resistance problem may occur in a boron nitride powder containing an OH group as well.

PRIOR ART DOCUMENTS

Patent Documents

Patent Document 1: JP-A 2015-137335
Patent Document 2: JP-A 2010-076956

Non-Patent Document

Non-patent Document 1: Langmuir 1993 9 1486-1491

DISCLOSURE OF THE INVENTION

Problem to be Solved by the Invention

It is therefore an object of the present invention to provide a hexagonal boron nitride powder which develops high affinity for a resin and high water resistance, also develops high heat conductivity when it is filled into a resin and provides a resin composition having high dielectric strength.

It is another object of the present invention to provide a process for producing the above hexagonal boron nitride powder of the present invention.

Other objects and advantages of the present invention will become apparent from the following description.

Means for Solving the Problem

According to the present invention, firstly, the above object of the present invention is to provide a hexagonal boron nitride powder whose maximum absorption peak within the measurement range of 3,100 to 3,800 $cm^{-1}$ of the diffuse reflectance fourier transform infrared spectrum is existent at 3,530 to 3,590 $cm^{-1}$.

According to the present invention, secondly, the above object of the present invention is attained by a process for producing a hexagonal boron nitride powder, comprising the steps of:

mixing together an oxygen-containing boron compound, a carbon source and an oxygen-containing calcium compound to ensure that the B/C ratio (elemental ratio) of B contained in the oxygen-containing boron compound to C contained in the carbon source becomes 0.75 to 0.86 and that the amount of the oxygen-containing calcium compound becomes 10 to 15 parts by mass in terms of CaO based on 100 parts by mass of the total in terms of $B_2O_3$ of the oxygen-containing boron compound and C of the carbon source;

heating the mixture in a nitrogen atmosphere at 1,450 to 1,550° C. for 4 hours or more and at 1,650 to 2,100° C. for 2 hours or more to reduction nitride it; and removing a by-product except boron nitride existent in the reaction product by acid cleaning, wherein the carbon source has a sulfur concentration of 1,000 to 10,000 ppm.

According to the above process, the hexagonal boron nitride powder of the present invention can be directly produced by a reduction nitriding method.

Preferably, the above hexagonal boron nitride powder of the present invention has a (B/A) ratio of absorption peak height A derived from hexagonal boron nitride at around 800 $cm^{-1}$ and the maximum absorption peak height B at 3,530 to 3,590 $cm^{-1}$ of the diffuse reflectance fourier transform infrared spectrum of not less than 0.02.

Preferably, the above hexagonal boron nitride powder has a specific surface area of not more than 15 $m^2/g$ and an oxygen concentration of not more than 0.3 mass %.

Preferably, the above hexagonal boron nitride has a boron nitride purity of not less than 99.95%.

Further, the above boron nitride powder of the present invention is preferred as a resin filler due to its characteristic properties and advantageously used as a resin composition comprising the boron nitride powder as a resin filler, or a radiator for electronic parts which is composed of a resin composition comprising the hexagonal boron nitride powder and either one of aluminum nitride and aluminum oxide or the above resin composition.

Effect of the Invention

The biggest feature of the hexagonal boron nitride powder of the present invention is that the maximum absorption peak within the measurement range of 3,100 to 3,800 $cm^{-1}$ of the diffuse reflectance fourier transform infrared spectrum is existent at 3,530 to 3,590 $cm^{-1}$ as described above.

That is, in general, when an $NH_2$ group on the surface of the hexagonal boron nitride powder is measured by diffuse reflectance infrared spectroscopy, there is no example in which the symmetrical stretching vibration peak of the $NH^2$ group at 3,350 to 3,500 $cm^{-1}$ or the vibration peak of an OH group at 3,600 to 3,750 $cm^{-1}$ is observed as the main peak, or the asymmetrical stretching vibration peak of the $NH_2$ group at 3,530 to 3,590 $cm^{-1}$ is observed as the main peak within the measurement range of 3,100 to 3,800 $cm^{-1}$ of the diffuse reflectance fourier transform infrared spectrum.

The hexagonal boron nitride powder of the present invention exhibits excellent affinity for a resin while developing high water resistance due to the above feature.

Although the reason that the hexagonal boron nitride powder of the present invention in which the asymmetrical stretching vibration peak of the $NH_2$ group at 3,530 to 3,590 $cm^{-1}$ is observed as the main peak develops the above characteristic properties is unknown, as shown in FIG. 9 of Example 1 which will be described hereinafter, according to a TEM (Transmission Electron Microscope) photograph of the hexagonal boron nitride powder, the particle end part of hexagonal boron nitride constituting the hexagonal boron nitride powder of the present invention appears as if the loop of the particle end part is broken by modification whereas the particle end part of conventional hexagonal boron nitride shown in FIG. 10 of Comparative Example 1 is blocked like a loop. It is assumed that since the $NH_2$ group is existent at the above particle end part at a high density in this structure, the hexagonal boron nitride has the above characteristic peak and develops affinity for a resin. An OH group which causes hydrolysis is rarely existent at a part except the particle end part in hexagonal boron nitride which is provided with a functional group by a conventional post-treatment, thereby developing high water resistance.

According to the process for producing the above hexagonal boron nitride powder of the present invention, the hexagonal boron nitride powder of the present invention can be directly produced by a reduction nitriding method under a specific heating condition using an oxygen-containing boron compound, a carbon source having a specific sulfur concentration and an oxygen-containing calcium compound.

BRIEF DESCRIPTION OF THE DRAWINGS

FIG. 1 This is a diagram which illustrates how to obtain the B/A ratio of absorption peak height A at around 800 $cm^{-1}$ and absorption peak height B at 3,530 to 3,590 $cm^{-1}$ in diffuse reflectance infrared spectrometry.

FIG. 2 This shows the diffuse reflectance infrared spectral data of a hexagonal boron nitride powder measured in Example 1.

FIG. 3 This shows the diffuse reflectance infrared spectral data of a hexagonal boron nitride powder measured in Example 2.

FIG. 4 This shows the diffuse reflectance infrared spectral data of a hexagonal boron nitride powder measured in Example 3.

FIG. 5 This shows the diffuse reflectance infrared spectral data of a hexagonal boron nitride powder measured in Example 4.

FIG. 6 This shows the diffuse reflectance infrared spectral data of a hexagonal boron nitride powder measured in Comparative Example 1.

FIG. 7 This shows the diffuse reflectance infrared spectral data of a hexagonal boron nitride powder measured in Comparative Example 2.

FIG. 8 This shows all the spectral data of FIGS. 2 to 7.

FIG. 9 This is a TEM photograph showing the typical end faces of hexagonal boron nitride particles obtained in Example 1.

FIG. 10 This is a TEM photograph showing the typical end faces of hexagonal boron nitride particles obtained in Comparative Example 1.

PRACTICAL EMBODIMENT OF THE INVENTION (Hexagonal Boron Nitride Powder)

In the present invention, after it was confirmed that there was no attributed peak except for hexagonal boron nitride in the X-ray diffraction measurement of powders produced in Examples and Comparative Examples which will be described hereinafter and that the powders were identified as hexagonal boron nitride powders, further analysis was made. The X-ray diffraction measurement was carried out by using the SmartL B/A fully automated horizontal multi-purpose X-ray diffraction apparatus of Rigaku Corporation. As for measurement conditions, the scanning speed was 20°/min, the step width was 0.02°, and the scanning range was 10 to 90°.

In the present invention, the diffuse reflectance infrared absorption spectrum of the hexagonal boron nitride powder can be confirmed by diffuse reflectance infrared spectroscopy as shown in Examples which will be described hereinafter. For example, it can be measured by using the FTS-3000 of Agilent Technologies.

The hexagonal boron nitride powder of the present invention is characterized in that the maximum absorption peak within the range of 3,100 to 3,800 $cm^{-1}$ of the diffuse reflectance fourier transform infrared spectrum is existent at 3,530 to 3,590 cm$^{-1}$, specifically around 3,568 cm$^{-1}$.

In general, as means of identifying the surface functional group of the hexagonal boron nitride powder, there is known diffuse reflectance infrared spectrometry, and it is known that the vibration of an OH group is observed at 3,600 to 3,750 cm$^{-1}$, the symmetrical stretching vibration of an NH$_2$ group is observed at 3,350 to 3,500 cm$^{-1}$, and the asymmetrical stretching vibration of an NH$_2$ group is observed at 3,530 to 3,590 cm$^{-1}$.

However, there is no hexagonal boron nitride powder of the prior art in which the asymmetrical stretching vibration peak of an NH$_2$ group at 3,530 to 3,590 cm$^{-1}$ is the maximum peak within the peak range of the functional group on the particle surface of 3,100 to 3,800 cm$^{-1}$.

The hexagonal boron nitride powder of the present invention is characterized in that the above asymmetrical stretching vibration peak of the NH$_2$ group is the maximum peak and differs from other hexagonal boron nitride powders. In general, when the NH$_2$ group on the surface of the hexagonal boron nitride particle is measured by diffuse reflectance infrared spectroscopy, the symmetrical stretching vibration peak of the NH$_2$ group at 3,350 to 3,500 cm$^{-1}$ or the vibration peak of the OH group at 3,600 to 3,750 cm$^{-1}$ is observed as the main peak, and the asymmetrical stretching vibration peak of the NH$_2$ group at 3,530 to 3,590 cm$^{-1}$ is not observed as the main peak.

As for the difference in intensity between the symmetrical and asymmetrical stretching vibration peaks, in the case of an aromatic NO$_2$ group, for example, it is known that the intensity of the symmetrical stretching vibration of the NO$_2$ group increases when an NH$_2$ group is substituted at a para-position. It is assumed that this is caused by a difference in the environment of an atom directly bonded to the NO$_2$ group. Meanwhile, observing the main peak in the asymmetrical stretching vibration of the NH$_2$ group at 3,530 to 3,590 cm$^{-1}$ in the hexagonal boron nitride powder of the present invention means that the density of the NH$_2$ groups is high. It is assumed that NH$_2$ groups are concentrated at the end part as the end part of the hexagonal boron nitride particle of the present invention is broken characteristically in the above TEM photograph.

Since the hexagonal boron nitride powder of the present invention has the NH$_2$ groups at a high density, it develops affinity for a resin and is able to reduce heat resistance at the interface between the particle and the resin when a resin composition comprising the powder is prepared. Further, an OH group which causes hydrolysis is rarely existent at a part except the end part in a hexagonal boron nitride powder which has been provided with a functional group by a conventional post-treatment, thereby developing high water resistance.

In the present invention, as for the asymmetrical stretching vibration peak intensity of the NH$_2$ group at 3,530 to 3,590 cm$^{-1}$ of the hexagonal boron nitride powder of the present invention, the B/A ratio of the absorption peak height A at around 800 cm$^{-1}$ and the absorption peak height B at 3,530 to 3,590 cm$^{-1}$ in diffuse reflectance infrared spectrometry is preferably not less than 0.02. It is more preferably not less than 0.03, much more preferably not less than 0.04. Although the upper limit is not particularly limited, it is 0.15, specifically nearly 0.10.

In the present invention, the above peak height ratio B/A is obtained by drawing abase line on the absorption peak in the diffuse reflectance infrared spectral data of the hexagonal boron nitride powder shown in FIG. 1 and measuring the distance up to an intersection between a straight line showing the wavelength of a peak top and the base line.

The hexagonal nitride boron powder of the present invention has an oxygen concentration of preferably not more than 0.3 mass %, more preferably not more than 0.2 mass %, much more preferably not more than 0.1 mass %. An oxygen concentration of more than 0.3 mass % is not preferred from the viewpoint of water resistance.

The oxygen concentration of the above hexagonal boron nitride powder is measured by a non-dispersive infrared absorption method as shown in Examples which will be described hereinafter and can be checked by, for example, the EMGA-620W (trade name) of Horiba, Ltd.

The specific surface area of the hexagonal boron nitride powder of the present invention is preferably not more than 15.0 m$^2$/g, more preferably 0.5 to 12.0 m$^2$/g, much more preferably 0.7 to 8.0 m$^2$/g. Since a hexagonal boron nitride powder having a specific surface area larger than 15.0 m$^2$/g contains a large number of fine particles, it causes heat resistance in an insulating radiation sheet and also may deteriorate in handling properties such as the swirling of the powder.

The specific surface area of the above hexagonal boron nitride powder can be measured by a BET-1 point method as shown in Examples which will be described hereinafter and can be checked by, for example, the Macsorb HM model-1201 (trade name) of Mountech Co., Ltd.

In the present invention, although the particle size distribution of the hexagonal boron nitride powder is not particularly specified, in general, the average particle diameter of the powder is preferably 0.1 to 150 μm.

The particle size distribution can be measured by a wet laser diffraction particle size distribution method. For example, it can be checked by the LA-950V2 (trade name) of Horiba, Ltd.

The purity of the hexagonal boron nitride powder of the present invention is preferably not lower than 99.0 mass %, more preferably not lower than 99.3 mass %, much more preferably not lower than 99.6 mass %. When the purity of the hexagonal boron nitride powder is lower than 99.0 mass %, not only the curing of a resin may be hindered by impurities disadvantageously but also heat conductivity and dielectric strength may be deteriorated. The purity (%) of the hexagonal boron nitride powder is a value obtained by subtracting the total content (%) of impurity elements except B and N out of measurement elements contained in the hexagonal boron nitride powder measured by the above-described fluorescent X-ray analyzing method from 100.

As a fluorescent X-ray analyzer, the ZSX Primus 2 (trade name) of Rigaku Corporation may be used.

(Process for Producing Boron Nitride Powder)

Although the process for producing the hexagonal boron nitride powder of the present invention is not particularly limited, its typical example is as follows. An oxygen-containing boron compound, a carbon source having a sulfur concentration of 1,000 to 10,000 ppm and an oxygen-containing calcium compound are mixed together to ensure that the B/C ratio (elemental ratio) of B contained in the oxygen-containing boron compound to C contained in the carbon source becomes 0.75 to 0.85 and that the amount of the oxygen-containing calcium compound becomes 10 to 15 parts by mass in terms of CaO based on 100 parts by mass of the total in terms of B$_2$O$_3$ of the oxygen-containing boron compound and C of the carbon source, the resulting mixture is heated and reduction nitrided in a nitrogen atmosphere at 1,450 to 1,550° C. for 4 hours or more and at 1,650 to 2,100°

C. for 2 hours or more, and a by-product except boron nitride existent in the reaction product is removed by acid cleaning.

Although the reason that the hexagonal boron nitride powder of the present invention is obtained by the above production process is unknown, the inventors of the present invention assume as follows. That is, (1) the reduction nitriding reaction which will be described hereinafter of the oxygen-containing boron compound, the carbon source and a nitrogen gas can be divided into (2) a reduction reaction for reducing boron oxide by the carbon source which is a reducing agent and (3) a nitriding reaction for reacting the nitrogen gas with a B gas. In the above reduction nitriding reaction (1), the oxygen-containing calcium compound forms a composite oxide liquid phase with boron oxide during baking, and the liquid phase covers around the hexagonal boron nitride particles to promote particle growth. The thus grown hexagonal boron nitride particles are obtained as particles having an aspect ratio (ratio of length of long axis to thickness) of 4 to 12. The particles are thick plate-like particles having a small aspect ratio and a higher ratio of end faces to plane faces than that of conventional scaly hexagonal boron nitride particles having the same length of the long axis as the above particles, thereby constituting the hexagonal boron nitride powder of the present invention.

At this point, the sulfur concentration of the carbon source which is a reducing agent plays an important role in the implementation of the present invention. That is, sulfur contained in the carbon source forms a compound such as CaS with the oxygen-containing calcium compound after the reduction reaction (2) and remains in the reaction product. Since the carbon source causes a reduction reaction through a solid-phase reaction with the oxygen-containing boron compound at this point, it is presumed that sulfur is also existent around the oxygen-containing boron compound and that sulfur is existent near a nitrogen molecule in a stage in which the nitriding reaction (3) proceeds. Since the sulfur atom and the nitrogen atom tend to interact with each other, it is assumed that particle growth proceeds while the nitrogen atom on the end faces of the hexagonal boron nitride particles interacts with the sulfur atom. It is considered that, after the above reduction nitriding reaction, sulfur is also removed when the composite oxide is removed by acid cleaning and the nitrogen atom is protonated at this point, thereby introducing an $NH_2$ group into the end faces of the hexagonal boron nitride particles highly selectively.

The hexagonal boron nitride particles obtained in the present invention are characterized in that the end faces are broken whereas the end faces of conventional hexagonal boron nitride particles are curved and connected together. Therefore, a functional group tends to be produced on the end faces.

$$B_2O_3+3C+N_2 \rightarrow 2BN+3CO \quad (1)$$

$$B_2O_3+3C \rightarrow 2B(g)+3CO \quad (2)$$

$$2B(g)+N_2 \rightarrow 2BN \quad (3)$$

(Raw Materials)

The raw materials in the above production process of the present invention are given below.

(Oxygen-Containing Boron Compound)

In the above production process of the present invention, a compound containing a boron atom is used without restriction as the oxygen-containing boron compound which is one of the raw materials. Examples of the compound include boric acid, boric anhydride, metaboric acid, perboric acid, hypoboric acid, sodium tetraborate and sodium perborate. In general, boric acid and boron oxide which are easily acquired are preferably used. Although the average particle diameter of the oxygen-containing boron compound in use is not particularly limited, it is preferably 30 to 500 μm, more preferably 50 to 400 μm, much more preferably 100 to 250 μm from the viewpoints of operation ease and reduction reaction control. That is, by using an oxygen-containing boron compound having an average particle diameter larger than 30 μm, it is easy to handle it. However, when the average particle diameter is larger than 500 μm, the reduction reaction of the oxygen-containing boron compound hardly proceeds.

(Oxygen-Containing Calcium Compound)

The oxygen-containing calcium compound forms a composite oxide with the oxygen-containing boron compound to obtain a composite oxide having a high melting point so that it becomes a particle growing catalyst for boron nitride particles and reacts with sulfur contained in the carbon source to serve as a sulfur volatilization inhibitor.

In the production process of the present invention, as the oxygen-containing calcium compound which is used as a crystallization catalyst and volatilization inhibitor for the oxygen-containing boron compound and sulfur, a known compound may be used without restriction. An oxygen-containing calcium compound containing oxygen and calcium is preferably used. Examples of the oxygen-containing calcium compound include calcium carbonate, calcium hydrogen carbonate, calcium hydroxide, calcium oxide, calcium nitrate, calcium sulfate, calcium phosphate and calcium oxalate. Out of these, oxygen-containing calcium compounds may be preferably used. The oxygen-containing calcium compounds include calcium carbonate, calcium hydrogen carbonate, calcium hydroxide, calcium oxide, calcium nitrate, calcium sulfate, calcium phosphate and calcium oxalate. They may be used in combination of two or more. Out of these, calcium oxide and calcium carbonate are preferably used.

A mixture of two or more of the above oxygen-containing calcium compounds may be used. The average particle diameter of the above oxygen-containing calcium compound is preferably 0.01 to 200 μm, more preferably 0.05 to 120 μm, particularly preferably 0.1 to 80 μm.

(Carbon Source)

In the production process of the present invention, the carbon source serves as a reducing agent, and a carbon source containing a specific amount of sulfur is preferably used to make sulfur contributed to a reaction surely. As the carbon source, a petroleum-derived carbon source containing sulfur is preferred. Although the above sulfur may be added alone separately from the carbon source, since it is preferred that sulfur should be close to the carbon source, it is preferred to premix sulfur with the carbon source by a ball mill in advance. When the above premixing is omitted, volatilization at the time of the reaction occurs violently, and sulfur needs to be added in large quantities and is scattered to the exhaust system of a reactor with the result that the exhaust system may be blocked.

The sulfur concentration of the above carbon source is 1,000 to 10,000 ppm, preferably 1,500 to 8,000 ppm, more preferably 2,000 to 6,000 ppm. That is, when the sulfur concentration is lower than 1,000 ppm, the asymmetrical stretching vibration peak of the $NH_2$ group of the obtained hexagonal boron nitride powder lowers and when the sulfur concentration is higher than 10,000 ppm, sulfur may remain as an impurity.

The carbon source is preferably highly reactive amorphous carbon, and carbon black is particularly preferably used as its quality is industrially controlled.

The average particle diameter of the above carbon source is preferably 0.01 to 3 µm, more preferably 0.02 to 2 µm, particularly preferably 0.05 to 1 µm. When the carbon source has an average particle diameter of not more than 3 µm, its reactivity becomes high and when the carbon source has an average particle diameter of not less than 0.01 µm, it is easy to handle it.

(Preparation of Raw Materials)

In the present invention, although the reduction nitriding reaction is carried out by supplying the carbon source and nitrogen, to obtain the hexagonal boron nitride powder of interest effectively, the B/C ratio (elemental ratio) of B contained in the oxygen-containing boron compound and the composite oxide to C contained in the carbon source must be set to 0.75 to 0.85, preferably 0.77 to 0.83. When the molar ratio is higher than 0.85, the amount of the boron compound which is volatilized without being reduced increases, whereby the yield is reduced and the production line is adversely affected by the above volatilized component. When the molar ratio is lower than 0.75, the amount of unreacted boron oxide becomes small and the amount of the above composite oxide which is formed with the oxygen-containing calcium compound containing sulfur after the reduction nitridation becomes small, thereby making it difficult to cover the hexagonal boron nitride particles with the result that the hexagonal boron nitride powder of interest is hardly obtained.

To obtain the hexagonal boron nitride powder of interest effectively in the present invention, it is necessary to mix 10 to 15 parts by mass in terms of CaO of the oxygen-containing calcium compound based on 100 parts by mass of the total (in terms of $B_2O_3$ and C) of the oxygen-containing boron compound and the carbon source. When the amount in terms of CaO is smaller than 10 parts by mass, it is difficult to form the composite oxide which is formed with boron oxide in an amount enough to cover the hexagonal boron nitride particles disadvantageously. Further, the amount of the boron compound which is volatilized without being reduced increases, whereby the yield is reduced and the production line is adversely affected by the above volatile component disadvantageously. When the amount in terms of CaO becomes larger than 15 parts by mass, an impurity derived from calcium may remain and plate-like hexagonal boron nitride single particles hardly grow disadvantageously.

The form of the mixture containing the above raw materials to be supplied to the reaction in the production process of the present invention is not particularly limited and may be powdery as it is or granular.

In the production process of the present invention, to mix the above raw materials, for example, an ordinary mixer such as a vibration mill, bead mill, ball mill, Henschel mixer, drum mixer, vibration stirrer or V-shaped mixer may be used.

For granulation, a binder is optionally used and a known method such as extrusion granulation, rolling granulation or granulation with a compactor may be used. In this case, the size of each granule is preferably nearly 5 to 10 mm.

(Carbothermal Reduction Nitridation)

In the boron nitride production process of the present invention, the supply of a nitrogen source into a reaction system may be carried out by known means. For example, it is most preferred to circulate a nitrogen gas into the reaction system of a reactor whose examples will be given hereinafter. As the nitrogen source in use, not only the above nitrogen gas but any gas which is able to nitride in the reduction nitriding reaction is acceptable. Stated more specifically, an ammonia gas may be used besides the above nitrogen gas. A mixed gas prepared by mixing a non-oxidizing gas such as hydrogen, argon or helium with a nitrogen gas or ammonia gas may also be used.

To obtain the hexagonal boron nitride powder of the present invention, it is important that a reaction should be carried out by heating at 1,450 to 1,550° C. for 4 hours or more and at 1,650 to 2,100° C. for 2 hours or more.

That is, by heating at a temperature range of 1,450 to 1,550° C. at which the reduction nitriding reaction begins to start for 4 hours or more, hexagonal plane faces are easily laminated together like layers, thereby making it possible to obtain hexagonal boron nitride particles having a small aspect ratio and a large amount of the $NH_2$ group on the particle end faces highly selectively. At a temperature lower than 1,450° C., the reduction nitriding reaction rate becomes low and at a temperature higher than 1,550° C., the reaction rate becomes too high disadvantageously. A reaction time of less than 4 hours is unsatisfactory.

To obtain hexagonal boron nitride particles having high crystallinity, the maximum heating in the reduction nitriding reaction must be carried out at 1,650 to 2,100° C., preferably 1,700 to 2,100° C., much more preferably 1,800 to 2,000° C. for 2 hours or more. That is, when the above temperature is lower than 1,650° C., the reduction nitriding reaction hardly proceeds and it is difficult to obtain hexagonal boron nitride particles having high crystallinity. When the temperature is higher than 2,100° C., the obtained effect reaches the ceiling, which is economically disadvantageous.

The process for producing the hexagonal boron nitride powder of the present invention can be carried out by using a known reactor which can control the reaction atmosphere. For example, an atmosphere control-type high-temperature furnace which carries out a heat treatment with high-frequency induction heating or heater, batch furnace and continuous furnaces such as pusher-type tunnel furnace and vertical reaction furnace may be used.

(Acid Cleaning)

In the production process of the present invention, since the reaction product obtained by the above-described reduction nitridation contains impurities such as composite oxide of boron oxide and calcium oxide besides the hexagonal boron nitride powder, acid cleaning is preferably carried out. The method of acid cleaning is not particularly limited and any known method may be employed. For example, by-product-containing boron nitride obtained after nitridation is crushed and injected into a container, and diluted hydrochloric acid (10 to 20 mass % of HCl) is added in an amount 5 to 10 times larger than the amount of the hexagonal boron nitride powder containing the impurities and brought into contact with the powder for 4 hours or more.

As the acid used for the above acid cleaning, nitric acid, sulfuric acid or acetic acid may be used besides hydrochloric acid.

After the above acid cleaning, pure water is used to clean off the remaining acid. As the method of cleaning, the acid used for acid cleaning is filtered, and boron nitride which has been acid cleaned is dispersed in the same amount of pure water as the amount of the acid in use and filtered again.

(Drying)

As for drying conditions for drying a water-containing block object after acid cleaning and aqueous cleaning, drying in the air having a temperature of 50 to 250° C. or under reduced pressure is preferred. The drying time is not particularly limited but preferably such that the moisture content becomes as close to 0% as possible.

(Classification)

The dried boron nitride powder may be subjected to rough crushing, the removal of rough particles with a sieve or the removal of fine powders by airflow classification.

(Use of Boron Nitride Powder)

The boron nitride powder of the present invention is not limited to particular use and can be used for known purposes without restriction. As for preferred use, it is used for resins as a filler to improve electric insulation or provide heat conductivity. In the above use of the boron nitride powder, the obtained resin composition has high electric insulation and heat conductivity.

The resin composition of the present invention can be used for known purposes without restriction. When it is mixed with a resin which will be described hereinafter to obtain a heat conductive resin composition or heat conductive molding, the composition or molding can be preferably used as a thermal interface material such as polymer-based radiation sheet or phase change sheet, organic radiation sheet such as radiation tape, radiation grease, radiation adhesive or gap filler, radiation paint such as radiation paint or radiation coating, radiation resin substrate such as PWB base resin substrate or CCL base resin substrate, insulation layer for metal base substrates such as aluminum base substrate and copper base substrate, and sealing material for power devices.

When the boron nitride powder of the present invention is used to prepare a resin composition, it may be mixed with an ordinary highly heat conductive insulation filler such as aluminum nitride or aluminum oxide.

Examples of the above resin include thermoplastic resins such as polyolefins, vinyl chloride resin, methyl methacrylate resin, nylon and fluororesin, thermosetting resins such as epoxy resin, phenol resin, urea resin, melamine resin, unsaturated polyester resin, silicon resin, bismaleimide triazine resin and urethane resin, and synthetic rubbers.

The above resin composition may comprise known additives such as polymerization initiator, curing agent, polymerization inhibitor, polymerization-delaying agent, coupling agent, plasticizer, ultraviolet absorbent, pigment, dye, antibacterial agent, organic filler and organic and inorganic composite filler. Another inorganic filler may be contained as long as the effect of the present invention is not damaged.

The boron nitride powder of the present invention may also be used as a raw material for cubic boron nitride and boron processed products such as boron nitride molded articles, nucleating agent for engineering plastics, phase change material, solid or liquid thermal interface material, release agent for molten metal or molten glass molds, cosmetics and composite ceramic raw material.

Out of these, for application in cosmetics, the boron nitride powder of the present invention can be advantageously used in foundation, milky lotion, base, face color, rouge, lipsticks, eye shadow, eyeliner, mascara, manicure, pedicure, cream, skin lotion, sunscreen, body powder, hair care preparations and cosmetics for babies. For application in foundation, blending the boron nitride powder of the present invention is particularly effective in improving fit feeling and covering power.

In the above application in cosmetics, components other than the boron nitride powder of the present invention are not particularly limited and known components may be used. For example, talc, mica, muscovite, sericite, silicon oxide, aluminum oxide, titanium oxide, zinc oxide, ethyl hexyl methoxy cinnamate, nylon 12, silica, iron oxide and methicone may be used. Out of these, a combination of talc, mica and the boron nitride powder of the present invention is particularly preferred as it is excellent in fit feeling and covering power.

EXAMPLES

The following examples are provided for the purpose of further illustrating the present invention but are in no way to be taken as limiting.

In the examples, measurement values were obtained by the following methods.

[Infrared Absorption Spectrum of Hexagonal Boron Nitride Powder]

The obtained hexagonal boron nitride powder was measured by diffuse reflectance infrared spectrometry using the FTS-3000 of Agilent Technologies. As a pre-treatment, a specimen was dried at 200° C. under reduced pressure for 2 hours. The specimen was packed into a measurement cup to be measured. The resolution was 4 $cm^{-1}$, the measurement range was 400 to 4,000 $cm^{-1}$, and the integrated number of times was 64. The existence or nonexistence of a peak at 3,100 to 3,800 $cm^{-1}$ at which a functional group on the surface of the obtained hexagonal boron nitride powder appears and the maximum absorption peak were checked. The B/A ratio of the absorption peak height A at around 800 $cm^{-1}$ and the absorption peak height B at 3,530 to 3,590 $cm^{-1}$ was obtained by using the above-described method.

[Specific Surface Area ($m^2$/g) of Hexagonal Boron Nitride Powder]

The specific surface area of the obtained hexagonal boron nitride powder was measured by using the Macsorb HM model-1201 of Mountech Co., Ltd.

[Oxygen Concentration (Mass %) of Hexagonal Boron Nitride Powder]

The oxygen concentration of the obtained hexagonal boron nitride powder was measured by using the EMGA-620W of Horiba, Ltd.

[Particle Diameter D1 (μm) at Cumulative Volume Frequency of 50% in Particle Size Distribution of Hexagonal Boron Nitride Powder]

The particle diameter (D1) at a cumulative volume frequency of 50% in the particle size distribution of the obtained hexagonal boron nitride powder was measured by using the LA-950V2 of Horiba, Ltd. The boron nitride powder was dispersed in an ethanol solvent for measurement. The particle diameter at a cumulative volume frequency of 50% in the obtained particle size distribution was taken as (D1).

[Purity (Mass %) of Hexagonal Boron Nitride Powder]

The purity of the obtained hexagonal boron nitride powder was measured by using the ZSX Primus2 of Rigaku Corporation. The purity (mass %) of the hexagonal boron nitride powder is a value obtained by subtracting the total content (%) of impurity elements except B and N out of the measurement elements of the hexagonal boron nitride powder measured by the above fluorescent X-ray analyzing method from 100.

[Sulfur Concentration (Ppm) of Raw Material Carbon Black]

The sulfur concentration of the raw material carbon black was measured by using the QS-AC1 of Yoshida Kagaku Kikai Co., Ltd.

Example 1

195 g of boron oxide, 82 g of carbon black having a sulfur concentration of 3,500 ppm and 49.4 g of calcium oxide were mixed together by using a ball mill. The (B/C) elemental ratio of the mixture was 0.82, and the amount of the above oxygen-containing calcium compound was 10.5 parts by mass in terms of CaO based on 100 parts by mass of the total in terms of $B_2O_3$ and C of the oxygen-containing boron compound, the carbon source and the oxygen-containing calcium compound. 100 g of the mixture was kept in a nitrogen gas atmosphere at 1,500° C. for 8 hours and at 1,850° C. for 4 hours by using a graphite Tannmann furnace to be nitrided. When the nitrided product was measured by fluorescent X-ray analysis, the sulfur concentration of the nitrided product was 200 ppm. Therefore, it was confirmed that sulfur remained.

Then, the by-product-containing boron nitride was crushed and injected into a container, and hydrochloric acid (7 mass % of HCl) was added in an amount 5 times larger than that of the by-product-containing boron nitride and stirred at a revolution of 700 rpm for 24 hours. After acid cleaning, the acid was filtered and boron nitride obtained by filtration was dispersed in the same amount of pure water as that of the acid used and filtered again. After this operation was repeated 6 times, the obtained product was vacuum dried at 200° C. for 6 hours.

The powder obtained after drying was put through a sieve having an opening of 120 μm to obtain a white powder. The obtained white powder was identified as hexagonal boron nitride by X-ray diffraction measurement. The diffuse reflectance infrared absorption spectrum, oxygen concentration, specific surface area, average particle diameter and purity of the obtained hexagonal boron nitride powder were measured by the above methods and shown in Table 2.

A TEM photograph of the typical end faces of hexagonal boron nitride particles obtained in this example is shown in FIG. 9. TEM observation was carried out by using the JEM-2100 of JEOL Ltd. It was confirmed that the hexagonal boron nitride particles obtained in Example 1 were modified such that the end parts of the end faces were broken.

When a plurality of SEM images measuring 60 μm×40 μm observed at a magnification of 2,000 of the boron nitride powder obtained in this example were analyzed with an image analyzer (A image-kun: manufactured by Asahi Kasei Engineering Corporation) and 500 different single particles were selected at random to measure the lengths of the long axes and the lengths in the thickness direction so as to calculate the aspect ratios from these values, the average aspect ratio was 6.7.

Example 2

The procedure of Example 1 was repeated except that the sulfur concentration of the raw material carbon black was 8,000 ppm, the (B/C) elemental ratio was 0.79, and the amount of the oxygen-containing calcium compound was 10.5 parts by mass in terms of CaO based on 100 parts by mass of the total in terms of $B_2O_3$ and C of the oxygen-containing boron compound, the carbon source and the oxygen-containing calcium compound. The conditions and measurement values are shown in Tables 1 and 2.

Example 3

The procedure of Example 1 was repeated except that the sulfur concentration of the raw material carbon black was 1,200 ppm, the (B/C) elemental ratio was 0.77, the amount of the oxygen-containing calcium compound was 11 parts by mass in terms of CaO based on 100 parts by mass of the total in terms of $B_2O_3$ and C of the oxygen-containing boron compound, the carbon source and the oxygen-containing calcium compound, and the reduction nitriding maximum temperature was 1,800° C. The conditions and measurement values are shown in Tables 1 and 2.

Example 4

The procedure of Example 1 was repeated except that the (B/C) elemental ratio was 0.75, the amount of the oxygen-containing calcium compound was 12 parts by mass in terms of CaO based on 100 parts by mass of the total in terms of $B_2O_3$ and C of the oxygen-containing boron compound, the carbon source and the oxygen-containing calcium compound, and the reduction nitriding maximum temperature was 1,950° C. The conditions and measurement values are shown in Tables 1 and 2.

The diffuse reflectance infrared spectra (3,100 to 3,800 $cm^{-1}$) of the hexagonal boron nitride powders obtained in Examples 1 to 4 are shown in FIGS. 2 to 5, respectively and collectively in FIG. 8. The maximum absorption peak was observed in the asymmetrical stretching vibration of the $NH_2$ group at 3,568 $cm^{-1}$ of the hexagonal boron nitride powders obtained in Examples 1 to 4. The B/A ratio of the absorption peak height A at around 800 $cm^{-1}$ and the absorption peak height B at 3,530 to 3,590 $cm^{-1}$ of each of the hexagonal boron nitride powders manufactured in Examples 1 to 4 and measured by diffuse reflectance infrared spectrometry was not less than 0.02.

Comparative Example 1

The procedure of Example 1 was repeated except that the sulfur concentration of the raw material carbon black was 100 ppm. The conditions and measurement values are shown in Tables 1 and 2. When the nitrided product treated in Comparative Example 1 was measured by fluorescent X-ray analysis, the sulfur concentration of the nitrided product was 10 ppm. Therefore, it was confirmed that the amount of remaining sulfur was smaller than that of Example 1.

Comparative Example 2

As Comparative Example 2, the analysis measurement values of the R—BN of Nissin Refratech Co., Ltd. in which the vibration of the OH group was observed at 3,600 to 3,750 $cm^{-1}$ and the symmetrical stretching vibration of the $NH_2$ group was observed at 3,350 to 3,500 $cm^{-1}$ are shown in Table 2.

The diffuse reflectance infrared spectra (3,100 to 3,800 $cm^{-1}$) of the hexagonal boron nitride powders obtained in Comparative Examples 1 and 2 are shown in FIGS. 6 and 7 and FIG. 8. A clear peak was not observed in the hexagonal boron nitride powder obtained in Comparative Example 1 whereas the maximum absorption peak was observed for the OH group at 3,670 $cm^{-1}$ in the hexagonal boron nitride powder of Comparative Example 2.

A TEM photograph showing the typical end faces of the hexagonal boron nitride particles obtained in Comparative Example 1 is shown in FIG. 10. It is understood that the end parts of the end faces of the hexagonal boron nitride particles obtained in Example 1 were curved and connected to one another and the functional groups were hardly bonded together.

Examples 5 to 8

Resin compositions were produced by filling boron nitride powders obtained in Examples 1 to 4 into an epoxy resin to evaluate heat conductivity. A mixture of 100 parts by mass of an epoxy resin (JER806 of Mitsubishi Chemical Corporation) and 28 parts by mass of a curing agent (alicyclic polyamine-based curing agent, JER Cure 113 of Mitsubishi Chemical Corporation) was prepared. 42 vol % of each base resin and 58 vol % of each of the above specific boron nitride powders were mixed together by means of a revolving/rotating mixer (MAZERUSTAR of Kurabo Industries Ltd.) to obtain a resin composition.

This was injected into a mold and cured at a temperature of 200° C., a pressure of 5 MPa and a retention time of 30 minutes by using a thermal press to manufacture a sheet having a diameter of 40 mm and a thickness of 0.22 mm. This sheet was analyzed by a temperature wave heat analyzer to calculate its heat conductivity which is shown in Table 3. The heat conductivities of the sheets manufactured by filling the boron nitride powders produced in Examples 1 to 4 were high at not less than 7.0 W/m·K. The dielectric strengths measured by a withstand voltage tester (manufactured by Tamadensoku Co., Ltd.) are shown in Table 3. The average dielectric strength was high at not less than 45 kV/mm. The copper foil peel strengths of the resin compositions were obtained based on JIS C6481. They were obtained as relative values when the value obtained by using the hexagonal boron nitride powder produced in Example 1 was 1.

Comparative Examples 3 and 4

The procedure of Examples 5 to 8 was repeated except that the boron nitride powder obtained in Comparative Example 1 and the hexagonal boron nitride powder obtained in Comparative Example 2 were used. The sheets were analyzed by a temperature wave heat analyzer to calculate their heat conductivities which are shown in Table 3. The dielectric strengths measured by a withstand voltage tester (manufactured by Tamadensoku Co., Ltd.) are shown in Table 3. The copper foil peel strengths of the resin compositions were obtained based on JIS C6481. They were obtained as relative values when the value obtained by using the hexagonal boron nitride powder produced in Example 1 was 1. The heat conductivities and dielectric strengths of sheets produced by filling the hexagonal boron nitride powder obtained in Comparative Example 1 and the commercially available hexagonal boron nitride powder of Comparative Example 2 were low at not more than 7.0 W/m·K and not more than 45 kV/mm, respectively. The copper foil peel strength was not more than 0.5 when the value of Example 1 was 1. Thus, they had low adhesive strength.

TABLE 1

| Example Comparative Example | B/C ratio *1 | parts by mass in terms of CaO *2 | sulfur concentration in C (ppm) | reduction nitriding temperature (° C.) |
|---|---|---|---|---|
| Example 1 | 0.82 | 9.0 | 3500 | 1850 |
| Example 2 | 0.79 | 10.5 | 8000 | 1850 |
| Example 3 | 0.75 | 11.0 | 1200 | 1800 |
| Example 4 | 0.72 | 12.0 | 1200 | 1950 |
| Comparative Example 1 | 0.82 | 9.0 | 100 | 1850 |

*1 B/C (elemental ratio) of B source contained in oxygen-containing boron compound and composite oxide and carbon source
*2 parts by mass in terms of CaO based on 100 parts by mass of the total of oxygen-containing boron compound and carbon source.

TABLE 2

| Example Comparative Example | Maximum absorption peak measured by diffuse reflectance infrared spectrometry*1 | ratio of peak heights (B/A) | specific surface area (m$^2$/g) | oxygen concentration (mass %) | purity of hexagonal boron nitride (mass %) | D1 (μm) |
|---|---|---|---|---|---|---|
| Example 1 | 3568 cm$^{-1}$ | 0.06 | 1.2 | 0.14 | 99.98 | 11 |
| Example 2 | 3568 cm$^{-1}$ | 0.08 | 2.0 | 0.23 | 99.98 | 14 |
| Example 3 | 3568 cm$^{-1}$ | 0.04 | 2.4 | 0.17 | 99.97 | 20 |
| Example 4 | 3568 cm$^{-1}$ | 0.04 | 5.9 | 0.08 | 99.98 | 110 |
| Comparative Example 1 | No absorption peak | — | 1.2 | 0.15 | 99.97 | 11 |
| Comparative Example 2 | 3670 cm$^{-1}$ | — | 9.7 | 0.35 | 99.80 | 5 |

*1 maximum peak value at 3,100 to 3,800 cm$^{-1}$ of diffuse reflectance fourier transform infrared spectrum

TABLE 3

| | Boron nitride powder | heat conductivity (W/m · K) | dielectric strength (KV/mm) | peel strength |
|---|---|---|---|---|
| Example 5 | Example 1 | 7.3 | 48.3 | 1.0 |
| Example 6 | Example 2 | 7.9 | 45.3 | 1.1 |
| Example 7 | Example 3 | 7.2 | 47.3 | 1.2 |
| Example 8 | Example 4 | 10.2 | 46.3 | 1.2 |
| Comparative Example 3 | Comparative Example 1 | 6.2 | 43.2 | 0.5 |
| Comparative Example 4 | Comparative Example 2 | 5.2 | 38.2 | 0.4 |

The invention claimed is:

1. A hexagonal boron nitride powder whose maximum absorption peak within the range of 3,100 to 3,800 cm$^{-1}$ is existent at 3,530 to 3,590 cm$^{-1}$ in the diffuse reflectance fourier transform infrared spectrum.

2. The hexagonal boron nitride powder according to claim 1, wherein the (B/A) ratio of absorption peak height A derived from boron nitride at around 800 cm$^{-1}$ and maximum absorption peak height B within the range of 3,530 to 3,590 cm$^{-1}$ of the diffuse reflectance fourier transform infrared spectrum is not lower than 0.02.

3. The hexagonal boron nitride powder according to claim 1 which has a specific surface area of not more than 15 m$^2$/g.

4. The hexagonal boron nitride powder according claim 1 which has an oxygen concentration of not more than 0.3 mass %.

5. A resin composition comprising the hexagonal boron nitride powder of claim 1.

6. A resin composition comprising the hexagonal boron nitride powder of claim 1 and an aluminum oxide powder and/or an aluminum nitride powder.

7. A heat conductive insulating sheet made of the resin composition of claim 5.

8. A radiation insulation member for electronic parts which comprises the heat conductive insulating sheet of claim 7.

9. A process for producing a hexagonal boron nitride powder, comprising the steps of:
   mixing together an oxygen-containing boron compound, a carbon source and an oxygen-containing calcium compound to ensure that the B/C ratio (elemental ratio) of B contained in the oxygen-containing boron compound and C contained in the carbon source becomes 0.75 to 0.85 and the amount of the oxygen-containing calcium compound becomes 10 to 15 parts by mass in terms of CaO based on 100 parts by mass of the total in terms of $B_2O_3$ of the oxygen-containing boron compound and C of the carbon source;
   heating and reduction nitriding the mixture in a nitrogen atmosphere at 1,450 to 1,550° C. for 4 hours or more and at 1,650 and 2,100° C. for 2 hours or more; and
   removing a by-product except boron nitride existent in the reaction product by acid cleaning, wherein
   the carbon source has a sulfur concentration of 1,000 to 10,000 ppm.

10. The hexagonal boron nitride powder according to claim 2 which has a specific surface area of not more than 15 $m^2/g$.

11. The hexagonal boron nitride powder according to claim 2 which has an oxygen concentration of not more than 0.3 mass %.

12. The hexagonal boron nitride powder according to claim 3 which has an oxygen concentration of not more than 0.3 mass %.

13. A resin composition comprising the hexagonal boron nitride powder of claim 2.

14. A resin composition comprising the hexagonal boron nitride powder of claim 3.

15. A resin composition comprising the hexagonal boron nitride powder of claim 4.

16. A resin composition comprising the hexagonal boron nitride powder of claim 2 and an aluminum oxide powder and/or an aluminum nitride powder.

17. A resin composition comprising the hexagonal boron nitride powder of claim 3 and an aluminum oxide powder and/or an aluminum nitride powder.

18. A resin composition comprising the hexagonal boron nitride powder of claim 4 and an aluminum oxide powder and/or an aluminum nitride powder.

19. A heat conductive insulating sheet made of the resin composition of claim 6.

* * * * *